UNITED STATES PATENT OFFICE 2,394,592

UNSATURATED DERIVATIVES OF CARBAMIC ACID

Albert G. Chenicek, Elmhurst, Long Island, N. Y., assignor to Pittsburgh Plate Glass Company, Pittsburgh, Pa., a corporation of Pennsylvania No Drawing. Application June 25, 1942,
Serial No. 448,436

8 Claims. (Cl. 260—78)

This invention relates to a new class of compounds which are the N,N'substituted bis (unsaturated alcohol carbamates) having the formula:

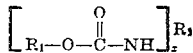

in which $R_1$ is the radical derived from an unsaturated alcohol, $R_2$ is an organic carbonylic radical to which the $x$ amide groups are attached through said carbonyl groups.

The unsaturated radicals $R_1$ may be the radicals derived from alcohols having from three to five carbon atoms and an unsaturated linkage in an aliphatic chain such as allyl, methallyl, 2-chloroallyl, 2-bromoallyl, propargyl, isopropenyl, crotyl, isocrotyl, chlorocrotyl, ethylallyl, butadienyl, tiglyl or angelyl alcohols, methyl vinyl carbinol, ethyl vinyl carbinol, etc. The radicals may also be those derived from unsaturated alcohols having six to ten carbon atoms and having an unsaturated linkage in an aliphatic chain such as linalool, phenyl propargyl alcohol, cinnamyl alcohol or chlorocinnamyl alcohol.

$R_2$ in the above formula may be any polyvalent radicals having terminal carbonyl groups such as carbonyl, oxalyl, phthalyl, malonyl, succinyl, adipyl, sulphuryl, tricarballyl, diglycolyl, etc., radicals terminated with carbonyl groups such as:

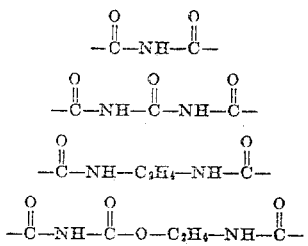

or $$-\overset{O}{\overset{\|}{C}}-NH-\overset{O}{\overset{\|}{C}}-C_2H_4-NH-\overset{O}{\overset{\|}{C}}-$$

The new compounds may generally be prepared by reacting carbamates such as allyl carbamate, methallyl carbamate, oleyl carbamate, etc., with acid chlorides of polybasic acids such as adipyl chloride, phthalyl chloride, phosgene, succinyl chloride, sulphuryl chloride, etc. The reactants are usually mixed and heated until the hydrogen chloride has been driven off. The product may be leached with water and recrystallized from a suitable solvent.

When phosgene is used as the acid chloride a specialized technique is preferred. The unsaturated carbamate or other amide is dissolved in a suitable solvent such as benzene, ether, chloroform, toluene, carbon tetrachloride, xylene, and petroleum ether, and treated with gaseous phosgene in the presence of an alkaline agent such as pyridine or other cyclic tertiary amine, or the oxides, hydroxides, and carbonates of the alkali metals and the alkaline earth metals. The product obtained in solution may be washed, dried, and the solvent vaporized by heating at reduced pressures.

The new compounds are capable of polymerization to form solid polymers in the presence of catalysts such as hydrogen peroxide, oxygen, organic peroxides, ultraviolet light, heat, etc. The resin products may be fabricated by methods well-known to the prior art. Accordingly, the materials may be cast polymerized with or without admixture of suitable solvents to form solid polymers of any desirable shape. Compositions may also be prepared by partially polymerizing to a fusible powder and molding by injection or fusion under pressure. Such compositions may also contain pigments, fillers, dyes, and/or fibrous reinforcement. Coating compositions may be made by incorporating in addition solvents and polymerizing a film applied to objects of wood, paper, metal, or other materials.

The polymers may be modified by incorporating plasticizers or by copolymerizing in the presence of butadiene, vinyl chloride, vinyl acetate or other vinyl compounds, phenolic resins, cellulose esters, urea plastics, acrylic esters, or similar compounds, unsaturated alcohol esters of polybasic acids, vinylidene chloride, etc., or with other synthetic or natural resins.

The nature of the new resins and methods of preparation are more fully set forth in the following examples:

*Example I*

Adipyl chloride (5.5 grams) was mixed 6.9 grams of methallyl carbamate and heated at 70 to 75° C. until no more hydrogen chloride was evolved which required about one-half hour. The solid product was extracted with hot water and recrystallized from ethyl alcohol. The ester-amide was a white solid melting at 173-175° C. The structural formula was found to be:

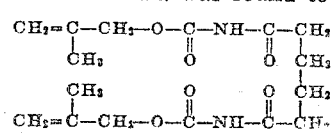

Example II

Allyl carbamate (50 grams) and 53 grams of phthalyl chloride were heated to 75–80° C. Hydrogen chloride was evolved for about twenty minutes and the temperature was maintained for ten minutes longer. The solid was washed with hot water and purified by recrystallization from benzene. The solid ester-imide was believed to have the structure:

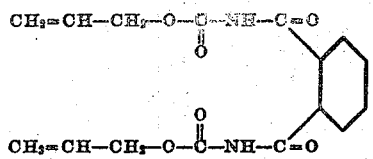

Example III

Allyl carbamate (101 grams), 85 grams pyridine, and 500 cc. benzene were placed in a reaction flask equipped with a stirring mechanism. The mixture was cooled in an ice bath and so maintained throughout the reaction. Phosgene was passed into the flask at the rate of 25 millimoles per minute for one-half hour. The excess phosgene was removed by treating with a small amount of pyridine and water. The benzene solution was washed with dilute hydrochloric acid then with water. It was dried over Na$_2$SO$_4$ and the benzene evaporated at reduced pressures. A white solid (m. p. 64–65° C.) having the following formula was obtained:

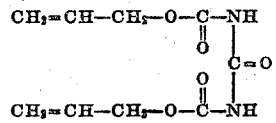

Example IV

Methallyl carbamate (58 grams), 78 grams of succinyl chloride and 100 cc. of benzene were heated at the reflux temperature for one hour. The benzene and residual HCl was evaporated by heating at reduced pressures. The solid obtained was washed with ethyl alcohol and dried. The white crystalline solid was found to correspond to the compound with the structure:

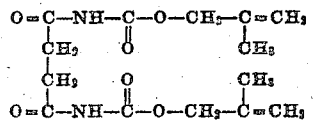

A five gram sample was mixed with 1.5 grams acetone peroxide and heated to 125° C. A brittle polymer was produced which remained solid at temperatures above 225° C.

Although the invention has been described with respect to certain specific details, it is not intended that these shall be limitations upon the scope of the invention except as incorporated in the following claims.

I claim:
1. A polymer of the compound:

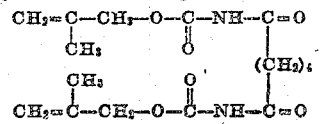

2. A polymer of the compound:

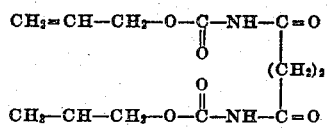

3. A polymer of the compound:

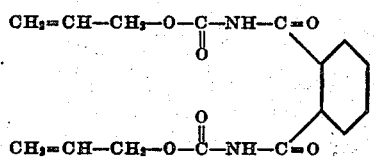

4. As a new compound N,N$^1$-bis (carballyloxy) phthalamide having the molecular structure:

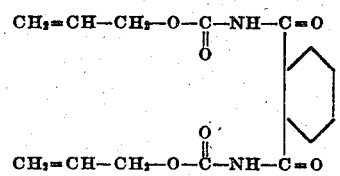

5. As a new compound N,N$^1$-bis (carballyloxy) succinamide having the molecular structure:

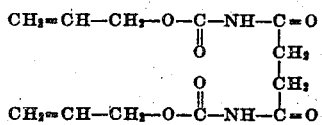

6. As a new compound N,N$^1$-bis (carbomethallyloxy) adipamide having the molecular structure:

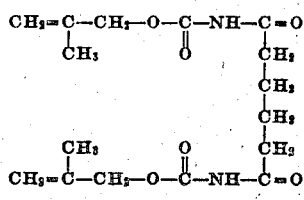

7. A compound corresponding to the following structural formula:

wherein R$_1$ is a radical corresponding to the radical R$_1$ in the alcohol R$_1$OH, said alcohol being an unsaturated monohydric alcohol having from three to ten carbon atoms and having an aliphatic unsaturated carbon to carbon linkage adjacent the beta carbon atom therein and R$_2$ is a radical selected from the group consisting of divalent saturated aliphatic hydrocarbon radicals and orthophenylene radical.

8. A polymer of the compound defined in claim 7.

ALBERT G. CHENICEK.